Figure 3:
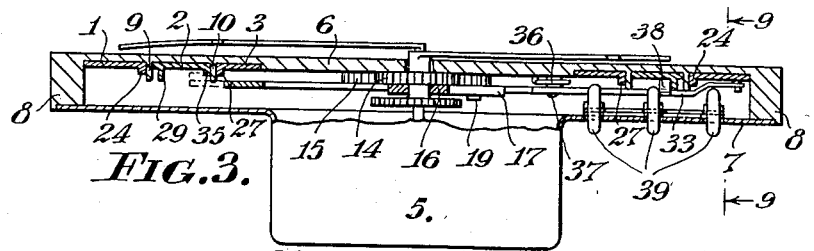

June 24, 1941.  T. H. HARRISON  2,246,883
DATE INDICATOR FOR TIMEPIECES
Filed Nov. 27, 1939  3 Sheets-Sheet 1
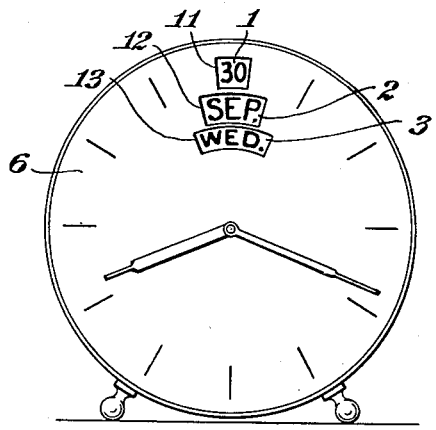
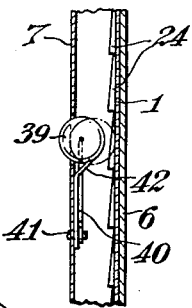
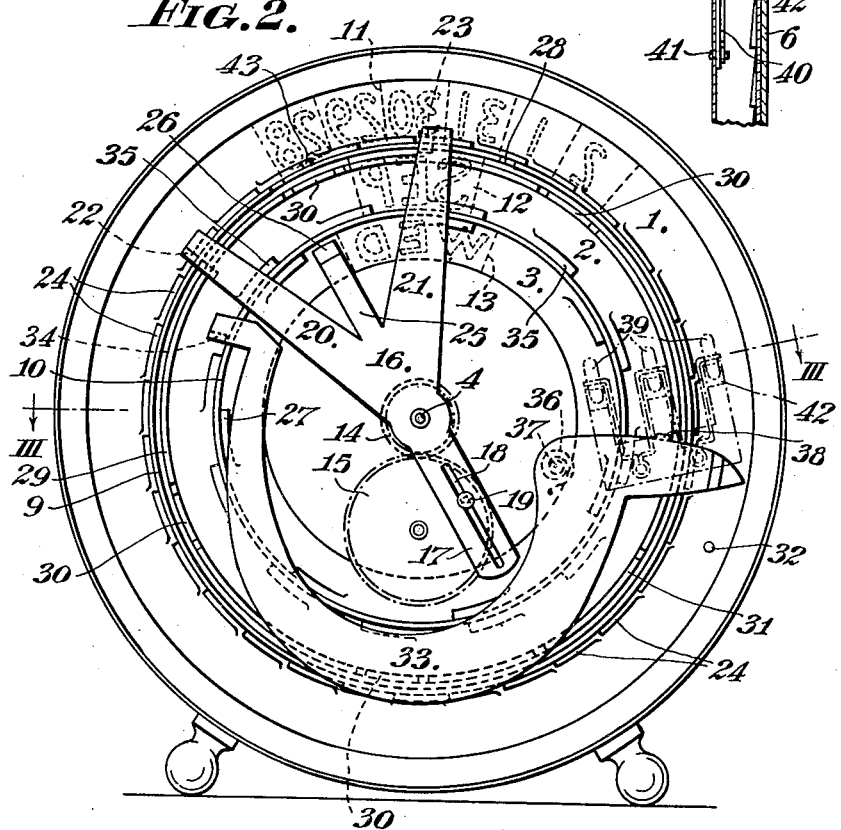
INVENTOR
THOMAS H. HARRISON June 24, 1941.                    T. H. HARRISON                    2,246,883
                          DATE INDICATOR FOR TIMEPIECES
                          Filed Nov. 27, 1939            3 Sheets-Sheet 2

INVENTOR.
THOMAS H. HARRISON
By Woehauster & Groff Attys

June 24, 1941.  T. H. HARRISON  2,246,883
DATE INDICATOR FOR TIMEPIECES
Filed Nov. 27, 1939   3 Sheets-Sheet 3

INVENTOR
Thomas H. Harrison,
BY Wolhaupter & Groff
ATTORNEYS

Patented June 24, 1941

2,246,883

UNITED STATES PATENT OFFICE 2,246,883

DATE INDICATOR FOR TIMEPIECES

Thomas Hills Harrison, Bolsover, England

Application November 27, 1939, Serial No. 306,405
In Great Britain November 18, 1938

7 Claims. (Cl. 58—5)

This invention relates to a new or improved date indicator or so-called perpetual calendar, adapted to be driven by timepieces, i. e. clocks and watches, and has for its object to provide a simple device or mechanism which can be readily fitted to existing timepieces without alteration to or interference with the normal functions of the time mechanism thereof. The date indicator is of a sturdy nature and particularly useful as an adaptation to electric mains clocks, is foolproof in operation and can be handled for setting or adjustment without fear of damage to the components of the indicator or of the clock mechanism. The date indicator or calendar is not strictly perpetual as it does not provide automatically for the inclusion of the twenty-ninth day of February every fourth year. However, provision is made for manual adjustment of the mechanism for this purpose, and the manual operation required every fourth year on this account does not materially affect the usefulness of the device, but rather, on the other hand, by omitting any complicated mechanism for securing automatic adjustment each leap year, simplifies to a great extent the mechanism actually required for date indicating. The word "date" is employed herein in two ways, first, generally to indicate the month, day of the month, and, if desired also, the name of the day of the week, and second, specifically the number of the day in the month. The context will show clearly in which sense the word is used. The mechanism may indicate simply the date (i. e. number of the day in the month) and the name of the month, or, if desired, the day, i. e. the name of the day of the week also, the modification to provide for all three, i. e. date, month and day being so simple as to add little to the cost of production.

Broadly, the invention provides a date indicator for timepieces comprising two rotatably mounted members bearing date numerals and the names of the months respectively, a member movable by means of the clockwork mechanism of the timepiece and adapted to impart intermittent rotary movement to the rotatable date member, a second member movable by means associated with the date member and adapted to impart intermittent rotary movement to the rotatable month member, and means to control the degree of rotation of the date member after the twenty-eighth day of the month according to the total number of days in the indicated month. Preferably a pair of concentric rotatable dials are employed, together with toothed gearing driven by the hour-hand spindle or pipe of the time mechanism of the timepiece, said gearing being adapted to rock intermittently at one-day periods a date lever which, in turn, imparts intermittent unidirectional rotary movement to the date dial. After every thirty-one intermittent movements, i. e. one complete revolution, of the date dial it actuates a rockably mounted month lever to advance the month dial through one twelfth of a revolution. If desired, a third rotatable member (e. g. a dial) bearing the names of the days of the week is provided, with means to impart an intermittent movement to said third member at one-day periods. The improved date indicator according to this invention by employing dials of flat-ring form makes possible the use of date, month and day markings which are visible over a comparatively long range, a feature of particular importance as applied to clocks.

Figure 4:
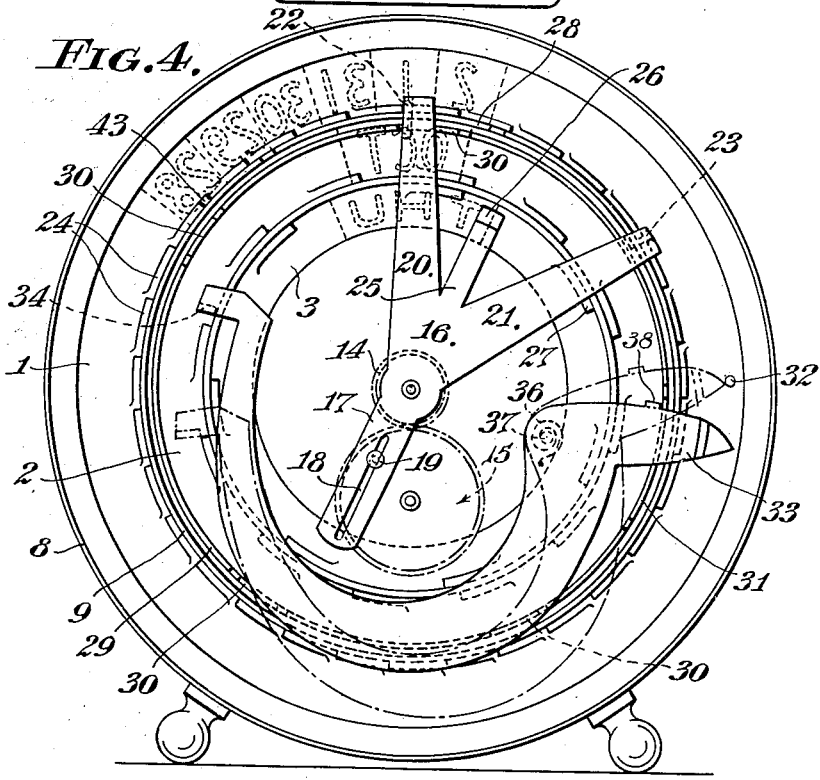
Figure 10:
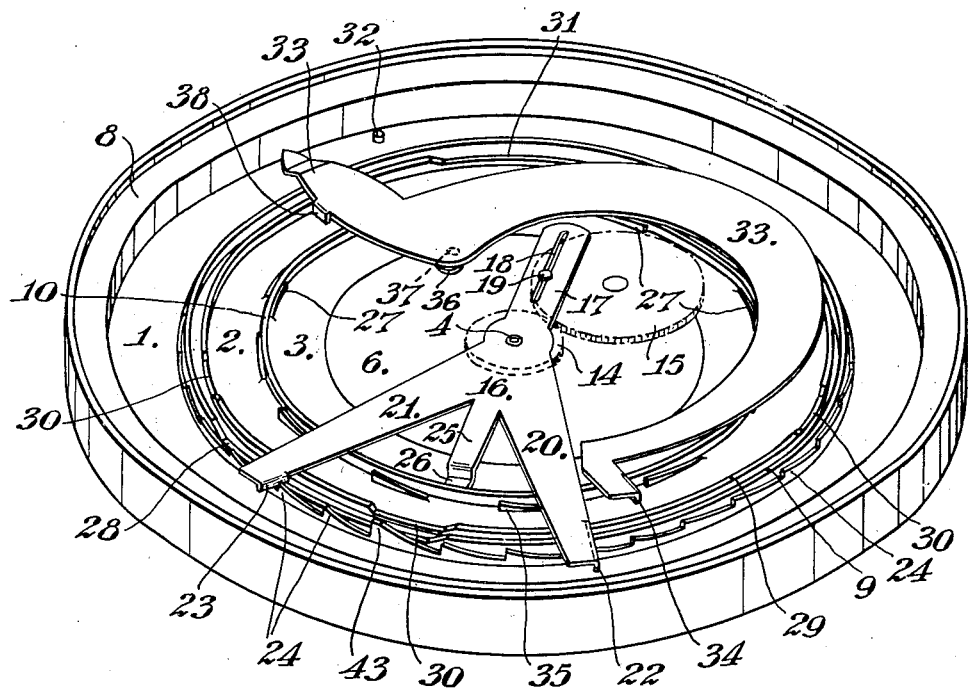
Figure 11:
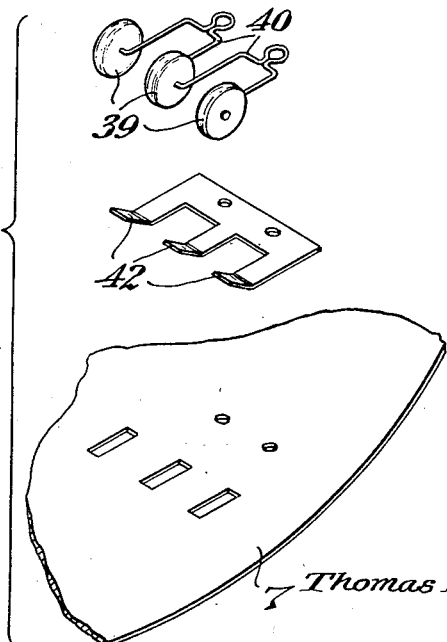

By way of example, the accompanying drawings illustrate an indicator applied to a clock showing the date, month and day. In the drawings, Figure 1 is a front elevation of the clock, Figure 2 is a rear elevation of the clock face or dial with the clock mechanism removed, Figure 3 is a cross section on line III, III of Figure 2, Figure 4 is a view similar to Figure 2, but showing the indicator mechanism in a different position, and Figures 5, 6, 7 and 8 are diagrams to illustrate the operation of the indicator, Figure 9 is a detail sectional view taken on the line 9—9 of Fig. 3 showing the means provided for setting or adjusting the date, month and day dials, Figure 10 is a perspective view of the mechanism, and Figure 11 is a perspective view showing the parts of the dial adjusting means in separated relationship. The date, month and day dials 1, 2, 3, respectively, are of flat ring form, concentric to one another and to the hour-hand pipe 4 of the clock mechanism 5 and are rotatably mounted upon a base plate 6 which may be and preferably is constituted by the face or dial of the clock. The clock mechanism 5, which is of any suitable construction, is supported by a back cover plate 7 carried by the outer rim 8 of the clock face 6. The date dial 1 and the month dial 2, and the month dial 2 and the day dial 3 are separated one from the other by fixed circular walls 9, 10, respectively, which may be pierced by means of pins (not shown) or some other devices, for retaining the dials 1, 2, 3 on their respective seatings on the back of the clock face 6. The clock face 6 is provided with three apertures or windows 11, 12, 13 through which portions of the three dials 1, 2, 3 respectively are visible from the front of the clock, said dials 1, 2, 3 bearing respectively the dates, i. e. the numbers of the days of a month (1 to 31 inclusive), the names of the months (January to December inclusive) and the names of the days of the week (Sunday to Saturday inclusive).

The hour-hand pipe 4, which completes one revolution every twelve hours, carries a toothed gear pinion 14 which meshes constantly with a toothed gear wheel 15 rotatably supported on the back of the clock dial 6, and of twice the diameter of the pinion 14, so that the wheel 15 completes one revolution every day (i. e. every 24 hours). Freely supported upon the pipe 4 is a fork or trident shaped lever 16, the tail portion 17 of which is provided with a longitudinal slot 18 through which passes a pin 19 carried by the wheel 15, so that as the wheel 15 turns it rocks or oscillates the trident lever 16 once every day. The two outer prongs 20, 21 of the trident lever 16 are of substantially equal length so as to extend over dials 2 and 3 onto the inner edge of dial 1, the prongs 20, 21 having depending claws 22, 23 respectively adapted to engage with a row of thirty-one teeth 24 formed adjacent the inner periphery of dial 1. The centre prong 25 of the trident lever 16 has an end claw 26 adapted to engage a row of seven teeth 27 formed on the dial 3. The prongs 20, 21 and 25 of the trident lever 16 are resilient to adapt the claws 22, 23 for ratchet-like cooperation with the teeth 24 and the claw 26 for ratchet-like cooperation with the teeth 27. The fixed circular wall 9 is provided with a gap 28 having inclined or ramp-like ends, and the month dial 2 is formed with a flange 29 having four gaps 30 of equal length and a single longer gap 31. The short gaps 30 are allotted to those months having each thirty days, that is, April, June, September and November, whilst the long gap 31 is allotted to February, that is, the twenty-eight day month. No gaps are provided in the flange 29 for the remaining, that is, the thirty-one day months. The manner in which the gap 28 of the fixed wall 9 and the gapped flange 29 of the dial 2 co-operate to control the engagement of the claws 22, 23 of the trident lever 16 with the date dial teeth 24 will be described more fully later. Meanwhile, it may be assumed that for each revolution at one-day periods of the wheel 15 the trident lever 16 is rocked and imparts to the date dial 1 for each oscillation an intermittent unidirectional rotary movement equal to a thirty-first part of one revolution. Each time the date dial 1 completes one revolution a pin 32 thereon contacts with the toe portion of a flat bow-shaped lever 33 pivotally supported on the back of the clock face 6. The head or top end of the lever 33 (hereinafter termed the month lever to distinguish it from the trident or date lever 16) is provided with a claw portion 34 which cooperates with a row of twelve teeth 35 formed on the month dial 2 to advance said dial 2 one twelfth of a revolution each time the month lever 33 is rocked or pivoted by the date dial pin 32. The month lever 33 is normally held in a retracted position by a coil spring 36 encircling the pivot pin 37 of the lever 33. A lug 38 depends from the lever 33 and bears on the dial 2 to hold same in position. To facilitate setting, resetting or adjustment of the dials 1, 2, 3 at any time, a set of three small rubber rollers 39 (see Figure 9) are provided, one for each dial. These rollers are rotatably mounted on spring arms of a resilient wire carrier 40 secured by a pair of screws 41 to the back cover plate 7. Normally the three rollers 39 are held by the spring arms of the resilient carrier 40 out of contact with the dials 1, 2, 3 and in closing relationship to three openings in the cover plate 7 through which the peripheries of the rollers 39 protrude, thereby precluding the entry of dust into the clock interior. For the purpose of rotatably adjusting any one of the dials 1, 2, 3 the appropriate roller 39 is pressed down to make rolling contact with the dial and then is rotated to rotate the dial. Upon release of any given roller its spring arm returns the same to its normal position. Each roller 39 is provided with a check spring 42 to prevent reverse rotation of the roller, so that the associated dial may be rotated in one direction only.

The operation of the mechanism is as follows: Each complete rotation of the gear wheel 15, corresponding to a twenty-four hour or a one-day period of time, oscillates the trident lever 16 through an angle corresponding approximately to one-seventh of a complete revolution. Thereby the claw 26 of the prong 25 of said lever is caused to cooperate with the successive teeth 27 of the day dial 3 to advance said dial one step or one-seventh of a complete revolution during the elapse of each twenty-four or one-day period of time. Consequently, during the elapse of each twenty-four hour or one-day period of time a new day-of-the-week indication on the day dial 3 is brought into alinement with the window 13.

The claw 22 of the triden lever prong 20 is of a length or width to overlie the teeth 24 of the date dial 1 and also to overlie the fixed circular wall 9 and the flange 29 of the month dial 2, whereby its cooperation with the teeth 24 of said date dial 1 is under the control of the depression 28 in said fixed wall 9 and the depressions 30 and 31 in the month dial flange 29. On the other hand, the claw 23 of the trident lever prong 21 is of lesser length or width than the claw 22 so as to overlie only the wall 9 and the teeth 24 of the date dial and not to overlie the flange 29 of the month dial, whereby its cooperation with the teeth 24 is unaffected by said flange 29.

The fixed circular wall 9, except where the depression 28 is formed therein, is of a depth as high and preferably slightly higher than the teeth 24; whereas, along the length of the depression 28 the depth of said wall 9 is as low as or lower than the bottoms of the teeth 24. The claws 22, 23 ride upon the free or what, for convenience, may be termed the top edge of the wall 9, being urged constantly thereagainst by the inherent resilience of the prongs 20, 21. Consequently, each of said claws is prevented by said wall 9 from engaging the teeth 24 except when it is disposed in the depression 28. The amplitude of movement of the prongs 20, 21 and, consequently, of the claws 22, 23 is greater than is required to advance the date dial 1 one step or one-thirty-first part of a revolution for each oscillation of the trident lever 16. Therefore, the near end of the depression 28, as regards the direction of advance of the date dial 1, is disposed to permit the claw 23 to enter said depression only near the end of its stroke during the final portion, to engage a tooth 24 and move dial 1 a distance corresponding to the length of one of the teeth 24, during what may be termed the forward movement of said claw 23. Therefore, for each oscillation of the trident lever 16, the date dial is advanced one step or one thirty-first part of a complete revolution by the claw 23.

If all months had thirty-one days there obviously would be no need of the prong 20 and its claw 22 or of the flange 29 on the month dial, but since different months have different numbers of days it is necessary to provide means to insure that, despite this, the dials 1 and 2 shall be advanced to correctly indicate the day and the month of the year. Such means is provided in the present instance by the claw 22 operating in conjunction with the depressions 30, 31 in the flange 29. February is the shortest month in the year and has twenty-eight days, leap year being disconsidered. All other months have at least twenty-eight days. Therefore, the mechanism is constructed to operate in the same manner for the first twenty-eight days of each month. March has thirty-one days and since March follows February which has only twenty-eight days it follows that after the mechanism has operated to indicate the twenty-eight days of February; that is, after twenty-eight oscillations of the trident lever 16 when the February designation on the dial 2 is alined with the window 12, the next oscillation of said trident lever must advance the date dial four steps or, in other words, through an angle corresponding to the lengths of four of the teeth 24 in order to bring the date indication "1" on said date dial into alinement with the window 11 as the month dial 2 is advanced one step to bring the indication for the month of March on said dial into alinement with the window 12. There are four thirty day months, namely, September, April, June and November. It follows, therefore, that after the thirty oscillations of the trident lever corresponding to the number of days in each of these months, the next oscillation of said trident lever must advance the date dial 1 two steps to insure alinement of the date indication "1" on said dial with the window 12 as the month dial 2 is advanced to bring the respective succeeding month indications into alinement with the window 12.

Figure 5:
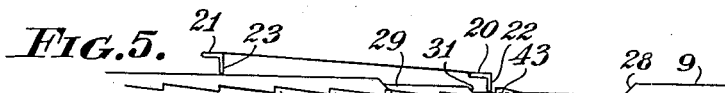
Figure 6:
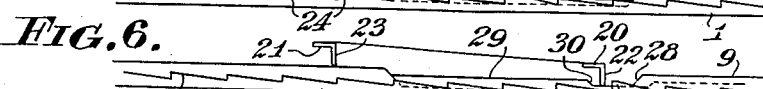
Figure 7:
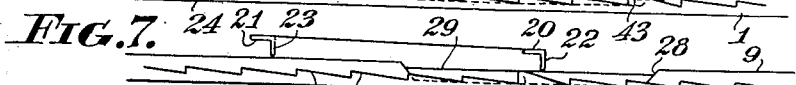
Figure 8:
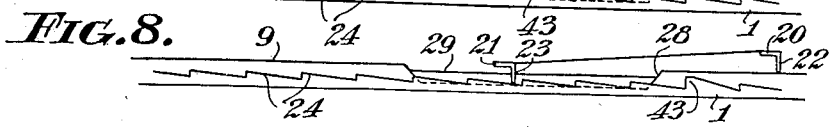

The tooth of the date dial 1 corresponding to the twenty-eighth day of the month is higher than the remaining teeth 24 of said dial. For convenience this tooth is designated as 43. It is not as high as the circular wall 9 nor as high as the flange 29, which flange and wall may be of equal height. During each oscillation of the trident lever 16 the claw 22 moves over the depression 28 in the circular wall 9, but unless one of the depressions 30 or 31 in the flange 29 is radially alined with the depression 28, said claw 22 is prevented by the flange 29 from dropping into the depression 28 and engaging the tooth 43 (see Fig. 7). On the other hand, when any one of the depressions 30 or 31 is radially alined with the depression 28, the claw 22 is permitted to drop sufficiently to engage the tooth 43 (see Figs. 5 and 6). The depressions 30, 31 are, however, of such depths as to permit the claw 22 to engage only the tooth 43 and not the teeth 24 (Figs. 5 and 6).

Upon completion of the last or twenty-eighth step of advance of the date dial 1 corresponding to the month of February the month dial 2 is advanced one step to bring the March indication in said month dial into alinement with the window 12 and at the same time the depression 31 of the flange 29 of said month dial is advanced into alinement with that part of the depression 28 in the circular wall 9 (see Fig. 5) traversed by the claw 22 so that the claw 22 may then engage the high tooth 43 when said tooth has been advanced to a position within the range of oscillation of said claw 22. The arrangement in this connection is such that as the end of the last day of February arrives, the high tooth 43 reaches a position to have the claw 22 drop down behind the same when the trident lever 16 is at the limit of what may be termed its back stroke. The lengths of the depressions 28, 31 are such that by the forward stroke of said trident lever the claw 22 cooperates with the high tooth 43 to advance the date dial 1 three steps and the claw 23 cooperates with one of the teeth 24 as usual to advance said date dial one additional step. The date indication "1" on said date dial thus is brought into alinement with the window 11 as the month dial is advanced one step to bring the March indication thereon into alinement with the window 11. By this step of advance of the month dial 2 the depression 31 in the flange 29 thereof is advanced to a point where it is ineffective to permit any surplus advance of the date dial 1 by the claw 22. The date dial then is advanced thirty-one steps by the next ensuing thirty-one oscillations of the trident lever 16, only the claw 23 effecting the advance. At the end of this series of thirty-one steps of advance of the date dial the month dial again is advanced one step and the April indication on the month dial is brought into alinement with the window 12. April has only thirty days. Therefore, one of the four short depressions in the flange 29 is disposed to be brought into radial alinement with that part of the depression 28 in the fixed circular wall 9 traversed by the claw 22 by this last mentioned step of advance of the month dial so as to permit the claw 22 to cooperate with the high tooth 43 when said high tooth has advanced to a position to permit said claw 22 to drop therebehind. The high tooth reaches a position to be engaged by the claw 22 during the thirty-first stroke of the trident lever 16 and is advanced one step by the claw 22 as determined by the shortness in length of the depression 30 and the usual one step by the claw 23. Thereby the date indication "1" on the date dial is brought into alinement with the window 11. The remaining three short depressions 30 are arranged to be brought into alinement with that part of the depression 28 traversed by the claw 22 at proper times to permit the claw 22 to effect an extra step of advance of the date dial during the first oscillation of the trident lever 16 following its thirty oscillations and steps of advance of the date dial corresponding to the remaining three thirty day months, June, September and November.

I claim:

1. A date indicator, comprising a rotatable month of the year indicating dial having designations of the twelve months of the year spaced equidistantly therearound, a rotatable date of the month indicating dial having the date numbers 1 to 31 spaced equidistantly therearound, an oscillatory lever element, means for oscillating said lever element once during each successive twenty-four hour period of time, means whereby each oscillation of said lever element effects one step of advance rotation of said date dial corresponding to one thirty-first part of a complete rotation thereof, means whereby the month indicating dial is advanced one step corresponding to one-twelfth of a complete rotation in response to each complete rotation of the date dial, fixed cam means, and cam means rotatable with said month dial and cooperating with said fixed cam means to control cooperation of said lever element with said date dial so that when the month dial is in a position indicating any month having less than thirty-one days successive operations of said lever element up to a number corresponding to the number of days in the indicated month are effective to impart to said date dial successive steps of advance each equal to one thirty-first part of a complete revolution and the next operation of said lever element is effective to complete rotation of said date dial.

2. A date indicator comprising a rotatable month of the year indicating dial having designations of the twelve months of the year spaced equidistantly therearound, a rotatable date of the month indicating dial having the date numbers 1 to 31 spaced equidistantly therearound, an oscillatory two-armed lever element, means for oscillating said lever element once during each successive twenty-four hour period of time, means whereby one arm of said lever element effects one step of advance rotation of said date dial corresponding to one thirty-first part of a complete rotation thereof, means whereby the month indicating dial is advanced one step corresponding to one-twelfth of a complete rotation in response to each complete rotation of said date dial, fixed cam means, and cam means rotatable with said month dial and cooperating with said fixed cam means to control cooperation of the other arm of said lever element with said date dial so that when the month dial is in a position indicating any month having less than thirty-one days said first mentioned arm is effective by successive operations of said lever element up to a number corresponding to the number of days in the indicated month to impart to said date dial successive steps of advance each equal to one thirty-first part of a complete revolution and both arms are effective by the next operation of said lever element to complete rotation of said dial.

3. A date indicator as set forth in claim 1 including a day-of-the-week indicating dial having designations of the seven days of the week spaced equidistantly therearound, and means whereby said dial is advanced one step corresponding to one-seventh of a complete revolution in response to each oscillation of the lever element.

4. A date indicator comprising a rotatable month of the year indicating dial having designations of the twelve months of the year spaced equidistantly therearound, a rotatable date of the month indicating dial having the date numbers 1 to 31 spaced equidistantly therearound, an oscillatory two-armed lever element, means for oscillating said lever element once during each successive twenty-four hour period of time, a fixed cam element controlling cooperation of one arm of said lever element with said date dial so that one step of advance of said dial corresponding to one thirty-first part of a complete rotation thereof is effected by said arm in response to each oscillation of said lever element, means whereby the month indicating dial is advanced one step corresponding to one-twelfth of a complete rotation in response to each complete rotation of said date dial, and cam means rotatable with said month dial and cooperating with said fixed cam means to control cooperation of the other arm of said lever element with said date dial so that when the month dial is in a position indicating any month having less than thirty-one days said other arm is effective by the oscillation of said lever element following the oscillation thereof corresponding to the number of days in the indicated month to advance the date dial a number of steps corresponding to the difference between the number of days in the indicated month and thirty-one.

5. A date indicator as set forth in claim 2 in which the cam means comprise a fixed wall and an annular flange, respectively, of which the fixed wall has a single depression and the annular flange has a number of depressions corresponding to the number of months in the year having less than thirty-one days and spaced so as to become alined with the depression in the fixed wall at predetermined times, thereby to control the cooperation of the second arm of the lever element with the date dial.

6. A date indicator as set forth in claim 2 in which the date dial is provided with thirty-one teeth equidistantly spaced therearound with which the lever arms cooperate to advance said dial, in which the twenty-eighth tooth is higher than the remaining teeth, and in which the cam means prevent cooperation of the second arm with the teeth other than said high tooth.

7. In combination with a time-piece having a rotatable element which completes a single complete rotation during each twenty-four hour period of time, a date indicator comprising a month of the year indicating dial having designations of the twelve months of the year spaced equidistantly therearound, a rotatable date of the month indicating dial having the date numbers 1 to 31 spaced equidistantly therearound, an oscillatory lever element, a pin and slot connection between said rotatable element and said lever element whereby said lever element is oscillated once during each successive twenty-four hour period of time, means whereby each oscillation of said lever element effects one step of advance rotation of said date dial corresponding to one thirty-first part of a complete rotation thereof, means whereby the month indicating dial is advanced one step corresponding to one-twelfth of a complete rotation in response to each complete rotation of the date dial, fixed cam means, and cam means rotatable with said month dial and cooperating with said fixed cam means to control cooperation of said lever element with said date dial so that when the month dial is in a position indicating any month having less than thirty-one days successive operations of said lever element up to a number corresponding to the number of days in the indicated month are effective to impart to said date dial successive steps of advance each equal to one thirty-first part of a complete revolution and the next operation of said lever element is effective to complete rotation of said date dial.

THOMAS HILLS HARRISON.